US012627955B2

(12) United States Patent
Hameed et al.

(10) Patent No.: US 12,627,955 B2
(45) Date of Patent: May 12, 2026

(54) PRIORITIZATION OF RECOMMENDED SHORTER MESSAGES

(71) Applicant: Apple Inc., Cupertino, CA (US)

(72) Inventors: Farha Hameed, San Diego, CA (US); Sanjay K Verma, San Jose, CA (US); Sajeesh Sl, Coimbatore (IN); Ashley M. Williams, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 18/351,932

(22) Filed: Jul. 13, 2023

(65) Prior Publication Data

US 2024/0022882 A1     Jan. 18, 2024

(30) Foreign Application Priority Data

Jul. 15, 2022    (IN) .............................. 202241040564

(51) Int. Cl.
*H04W 4/14*        (2009.01)
*H04W 24/08*       (2009.01)

(52) U.S. Cl.
CPC ............. *H04W 4/14* (2013.01); *H04W 24/08* (2013.01)

(58) Field of Classification Search
CPC ..... H04W 4/14; H04W 24/08; H04W 74/002; H04W 4/18
See application file for complete search history.

(56) References Cited

U.S. PATENT DOCUMENTS

| | | | | |
|---|---|---|---|---|
| 5,822,700 A | * | 10/1998 | Hult ........................ | H04W 4/14 455/458 |
| 5,991,633 A | * | 11/1999 | Corriveau ............. | H04W 28/06 455/515 |
| 6,097,961 A | * | 8/2000 | Alanara .................. | H04W 4/14 455/450 |
| 7,136,392 B2 | | 11/2006 | Wentink | |
| 7,403,768 B2 | * | 7/2008 | Bedingfield, Sr. .. | H04M 3/2218 455/418 |
| 7,991,894 B2 | | 8/2011 | Koskelainen | |
| 8,589,570 B2 | | 11/2013 | Delos Reyes | |
| 9,143,534 B1 | * | 9/2015 | Kelliher .............. | H04L 65/1069 |
| 9,742,829 B1 | | 8/2017 | Kelliher | |
| 2005/0020286 A1 | * | 1/2005 | Lazaridis .............. | H04W 88/06 455/403 |
| 2007/0087766 A1 | * | 4/2007 | Hardy ............... | H04M 1/72469 455/466 |
| 2007/0192403 A1 | * | 8/2007 | Heine ..................... | H04W 4/12 709/203 |
| 2019/0068540 A1 | | 2/2019 | Chowdhury | |
| 2020/0396769 A1 | * | 12/2020 | Newman ............... | H04W 92/20 |
| 2023/0137949 A1 | * | 5/2023 | Chaki .................... | G06N 20/00 370/229 |

FOREIGN PATENT DOCUMENTS

EP          3570571          11/2019

OTHER PUBLICATIONS

First Examination Report for IN 202241040564; Dec. 26, 2025.

* cited by examiner

*Primary Examiner* — Mong-Thuy T Tran
(74) *Attorney, Agent, or Firm* — Kowert, Hood, Munyon, Rankin & Goetzel, P.C.

(57)                ABSTRACT

This disclosure relates to techniques for performing transmission of a message in a wireless communication system. A recommended message length may be estimated based on channel conditions. A message may be prioritized for transmission based on user input and/or the recommended message length.

20 Claims, 9 Drawing Sheets

PRIORITIZATION OF RECOMMENDED SHORTER MESSAGES

PRIORITY DATA

This application claims benefit of priority to Indian Application No. IN202241040564, titled "Prioritization of Recommended Shorter Messages", filed Jul. 15, 2022, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing transmission of messages in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing transmission of messages in a wireless communication system.

In some embodiments, a user equipment (UE) device may wirelessly transmit a first message and determine that the UE device has not received a positive acknowledgement of the first message by a first time. In response to the determination that the UE device has not received the positive acknowledgement of the first message by the first time, the UE may calculate a recommended message length, provide a notification via one or more user interface based on the recommended message length, and select a prioritized message. The UE may wirelessly transmit the prioritized message.

In some embodiments, a user equipment (UE) device may receive, via one or more user interface, a first message, wirelessly transmit the first message, and determine that the UE device has not received a positive acknowledgement of the first message by a first time. In response to the determination that the UE device has not received the positive acknowledgement of the first message by the first time, the UE device may provide a notification via one or more user interface recommending to prioritize a shorter message and may receive, via the one or more user interface, an indication of a prioritized message, e.g., in response to the notification. The UE device may wirelessly transmit the prioritized message.

In some embodiments, a user equipment (UE) device may determine a channel condition for a wireless channel and determine, based on the channel condition, a recommended message length. The UE device may indicate, via a user interface, a notification based on the recommended message length. The UE device may receive, via the user interface, an indication of a prioritized message subsequent to indicating the notification, and transmit the prioritized message in response to the indication.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings.

Figure 1:
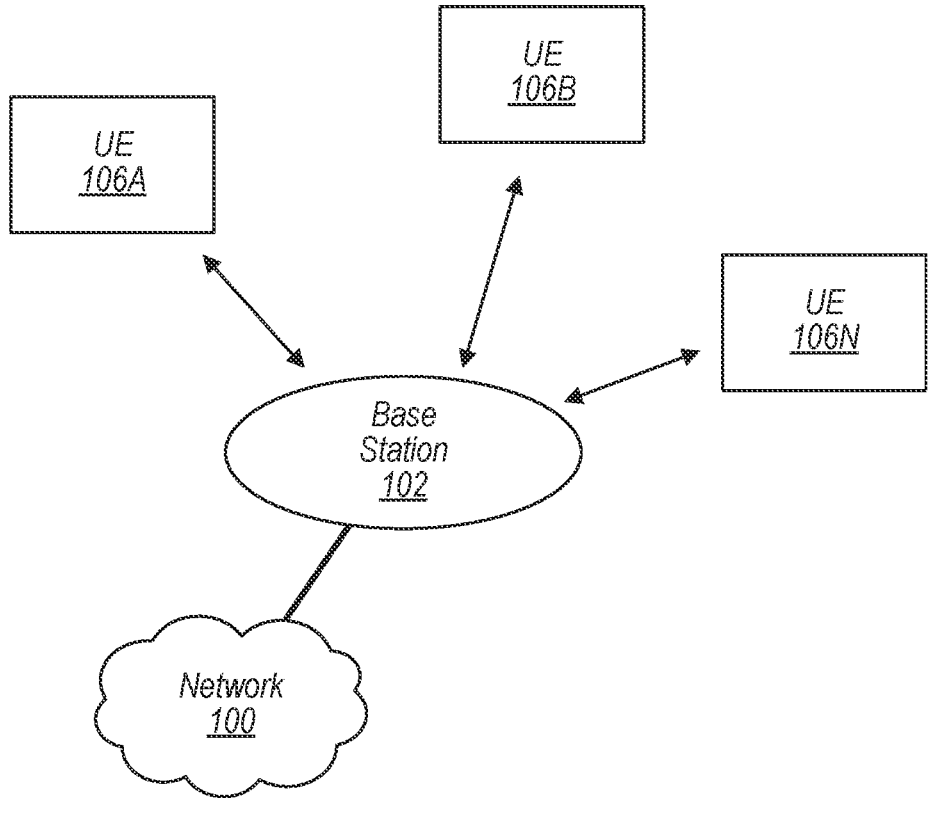
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment or user equipment device
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CSI: Channel State Information
CQI: Channel Quality Indicator
PMI: Precoding Matrix Indicator
RI: Rank Indicator

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
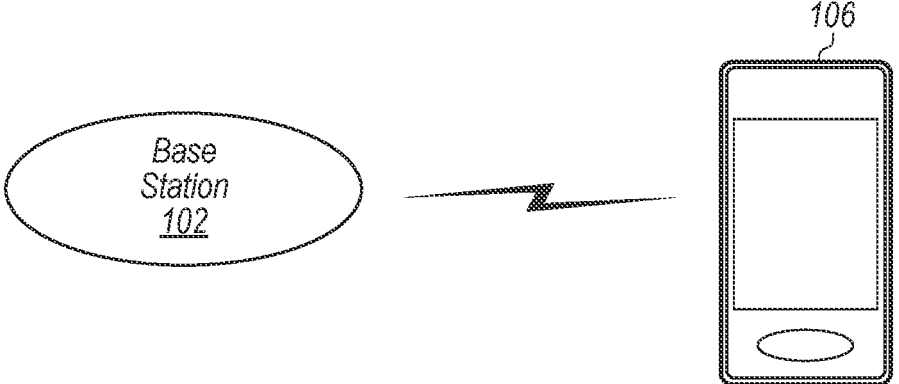
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N.

Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for performing prioritization and transmission of messages in a wireless communication system, such as according to the various methods described herein. The UE 106 might also or alternatively be configured to communicate using WLAN, BLUETOOTH™, one or more global navigational satellite systems (GNSS, e.g., GPS or GLONASS), peer-to-peer (P2P), device-to-device (D2D), mesh network, two-way satellite communication, one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLU-ETOOTH™. Other configurations are also possible.

In some embodiments, the UE 106 may include multiple subscriber identity modules (SIMs, sometimes referred to as SIM cards). In other words, the UE 106 may be a multi-SIM (MUSIM) device, such as a dual-SIM device. Any of the various SIMs may be physical SIMs (e.g., SIM cards) or embedded (e.g., virtual) SIMs. Any combination of physical and/or virtual SIMs may be included. Each SIM may provide various services (e.g., packet switched and/or circuit switched services) to the user. In some embodiments, UE

106 may share common receive (Rx) and/or transmit (Tx) chains for multiple SIMs (e.g., UE 106 may have a dual SIM dual standby architecture). Other architectures are possible. For example, UE 106 may be a dual SIM dual active architecture, may include separate Tx and/or Rx chains for the various SIMs, may include more than two SIMs, etc.

The different identities (e.g., different SIMs) may have different identifiers, e.g., different UE identities (UE IDs). For example, an international mobile subscriber identity (IMSI) may be an identity associated with a SIM (e.g., in a MUSIM device each SIM may have its own IMSI). The IMSI may be unique. Similarly, each SIM may have its own unique international mobile equipment identity (IMEI). Thus, the IMSI and/or IMEI may be examples of possible UE IDs, however other identifiers may be used as UE ID.

The different identities may have the same or different relationships to various public land mobile networks (PLMNs). For example, a first identity may have a first home PLMN, while a second identity may have a different home PLMN. In such cases, one identity may be camped on a home network (e.g., on a cell provided by BS 102) while another identity may be roaming (e.g., while also camped on the same cell provided by BS 102, or a different cell provided by the same or different BS 102). In other circumstances, multiple identities may be concurrently home (e.g., on the same or different cells of the same or different networks) or may be concurrently roaming (e.g., on the same or different cells of the same or different networks). As will be appreciated, numerous combinations are possible. For example, two SIM subscriptions on a MUSIM device may belong to the same equivalent/carrier (e.g., AT&T/AT&T or CMCC/CMCC). As another exemplary possibility, SIM-A may be roaming into SIM-B's network (SIM-A CMCC user roaming into AT&T and SIM-B is also AT&T).

Figure 3:
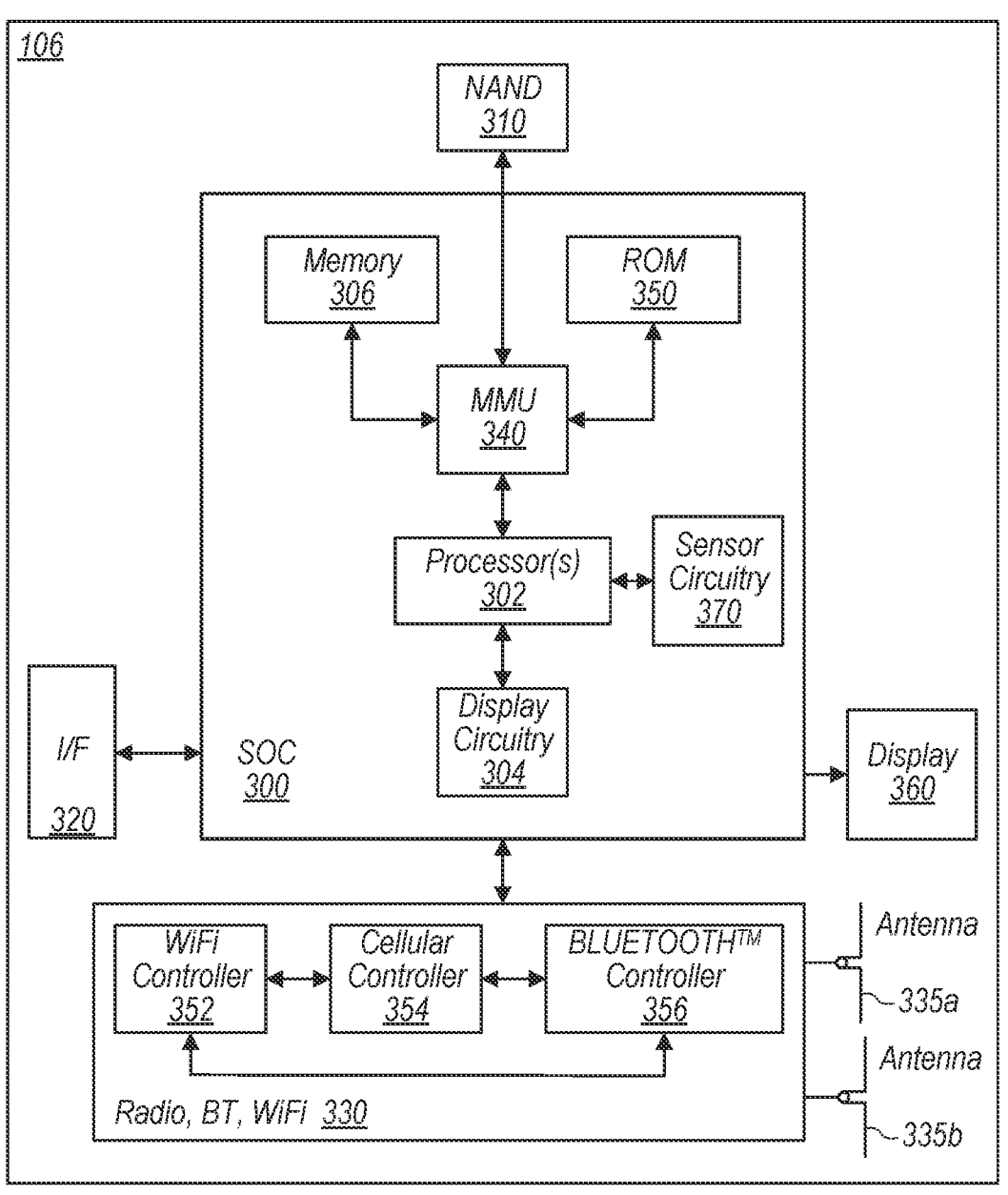
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for performing prioritization and transmission of prioritized communication in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for performing prioritization and transmission of prioritized communication in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
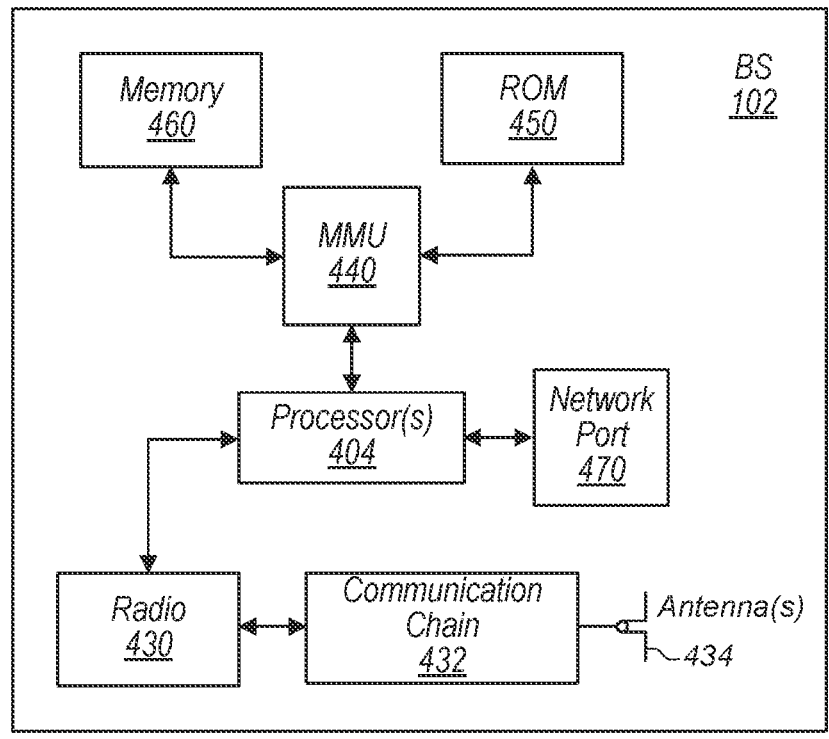
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Reference Signals

A wireless device, such as a user equipment, may be configured to perform a variety of tasks that include the use of reference signals (RS) provided by one or more devices, such as cellular base stations, transmission and reception points, access points, satellites, peer devices, etc. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3G PP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMEO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
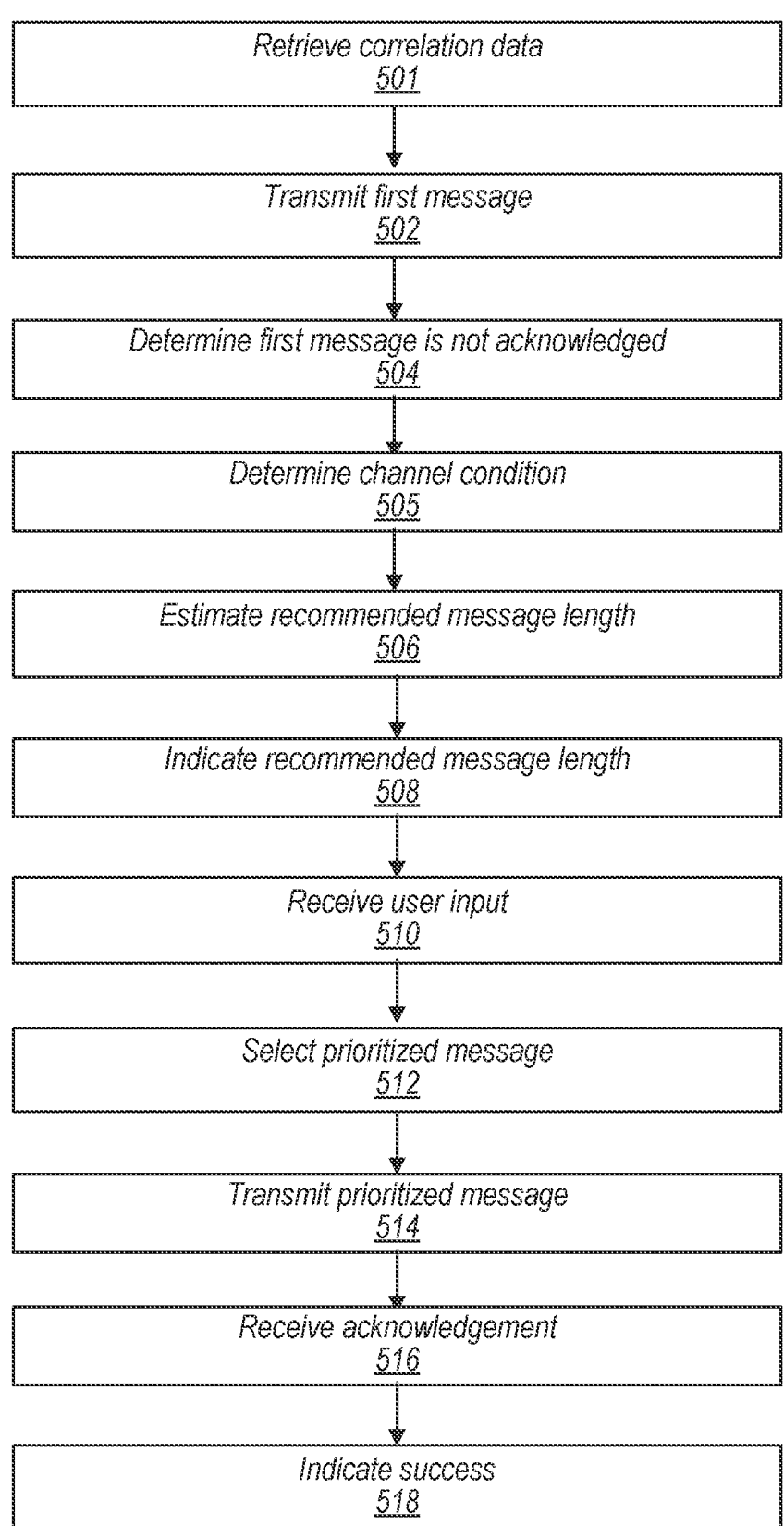
FIG. 5 is a flowchart diagram illustrating aspects of an exemplary possible method for performing transmission of a prioritized message in a wireless communication system, according to some embodiments.

FIG. 5—Prioritizing Transmission and Recommending Message Length for Transmission According to some wireless communication technologies, it may be possible for poor signal conditions to negatively impact the transmission of a message (e.g., such as a text, email, voice, video, graphic, and/or application message, e.g., of any application message service, etc.) by a UE. For example, a limited connection (e.g., limited bandwidth, limited throughput, and/or poor signal conditions due to interference, line of sight blockages, etc.) may lead to high block error rate (BLER), high bit error rate (BER), etc. Further, it is possible that high/long latency may exist in such limited connections (e.g., the round-trip time for a message and response may be long).

As one example, it is possible that a maximum number of datagrams (e.g., or packets, etc.) may be transmitted based on a digital system coding technique (e.g., forward error correction codes, convolutional codes, turbo codes, etc.). For example, such a maximum may be a maximum number of datagrams for a message from a source UE to a destination device (e.g., another UE, computer, etc.). If no positive acknowledgement (ACK) is received after the maximum number of datagrams is transmitted, it is likely that the message did not reach the destination. For example, due to latency this transmission may take seconds, minutes, or more. If the same message is retransmitted, there may be a further delay which may further degrade the user experience. The likelihood of a successful transmission of the message (e.g., within the maximum number of datagrams) may vary based on either or both of the connection limitations and the length of the message. For example, a shorter message may be more likely to reach the destination successfully within the maximum number of datagrams.

Thus, it may be beneficial to specify techniques for providing recommendations to a user for prioritizing shorter messages (e.g., existing shorter messages or new shorter messages, e.g., less than or equal to a recommended length) in limited connection scenarios. For example, a message size with a greater probability of success may be estimated, and used to prioritize messages and/or prompt the user to prioritize sufficiently short messages. To illustrate one such set of possible techniques, FIG. 5 is a flowchart diagram illustrating a method for performing such message prioritization and transmission in a wireless communication system, at least according to some embodiments.

Aspects of the method of FIG. 5 may be implemented by a wireless device, e.g., in conjunction with one or more destination device, such as a UE 106 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 may be described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The UE may retrieve correlation data (501), according to some embodiments. The correlation data may be useful for estimating an uplink error rate (UER) based on a downlink error rate (DER).

Note that, as used herein, the UER may refer to an error rate for a transmission from the UE to a destination device and the DER may refer to an error rate for a transmission from the destination device to the UE. Thus, in context of communication over a P2P or D2D network, the UER and DER may both be "sidelink" error rates, e.g., between peer devices in different directions.

The UE may retrieve the correlation data from a server (e.g., a configuration server) and/or from the UE's memory. For example, a configuration server may maintain and update such data. The UE may retrieve the data periodically and/or as needed. For example, the UE may retrieve a correlation table from the server when a messaging application is activated. Similarly, the UE may retrieve such a table from its own memory, e.g., an application processor may retrieve the table and provide it to a baseband processor, e.g., upon activation of a messaging application.

The UE may transmit a first message (502), according to some embodiments. The message may be input via a user interface of the UE, e.g., into a messaging application. In some embodiments, the message may be a text message, voice message, video message, graphic message, data message, etc.

In some embodiments, the message may be provided by the user into a messaging application. In some embodiments, the techniques of FIG. 5 may be applied with respect to a particular messaging application or type of messaging application.

The UE may transmit the first message over any of various types of wireless channels. The UE may transmit the first message to a destination device, such as another UE, computer, service center, application server, etc. The UE may transmit the first message to the destination device via any number (e.g., zero or more) intermediate devices. For example, the UE may transmit the message over a cellular connection, e.g., via one or more BS and a cellular network, to the destination. As another possibility, the UE may transmit the message over a P2P, D2D, or mesh network connection. In such a case, the UE may transmit the message directly to the destination device or via any number of intermediate devices. As another possibility, the UE may transmit the first message over any type of link sensitive wireless communication system, low bandwidth connection, etc. Intermediate devices may include any of UE, computer, satellite, base station, access point, router, and/or other devices, etc.

The UE may determine that it has not received a positive acknowledgement (ACK) in response to the first message (504), according to some embodiments. For example, the UE may determine that it has not received an ACK after a threshold amount of time. Such a threshold amount of time may be configured as desired, e.g., in seconds, frames, etc. As another possibility, the UE may determine that the first message has not been received by the destination device based on receiving a negative acknowledgement (NACK) for the first transmission.

In some embodiments, 502 and/or 504 may be omitted. For example, the method may proceed from 505 based on activation of a messaging application, for example a particular messaging application or particular type of messaging application. For example, any or all of 505-518 may be performed in response to initiation of an application, e.g., of a particular type, without previously transmitting a first message and/or determining that the first message is not acknowledged. Further, the correlation data may be retrieved at such a time (e.g., in association with 505 and/or 506) and/or may be retrieved at any prior or subsequent time.

The UE may determine one or more channel condition(s) (505), according to some embodiments. In some embodiments, the channel conditions may be determined in response to the determination that no ACK has been received for the first message. Alternatively, the channel conditions may be determined periodically and/or in response to activation of a messaging application, e.g., and/or particular messaging application or type of application.

As one possibility, the UE may determine a DER. The DER may be determined based on a history of downlink messages received by the UE (e.g., using a same connection or similar connection as the first message). For example, a decode failure rate for messages received within a certain amount of time and/or at a similar location may be determined. This failure rate may be the DER. Using the DER and the correlation data, the UE may determine a corresponding UER.

As another possibility, the UE may perform one or more measurements (e.g., signal strength, interference, noise, etc.). Such measurements may be used to estimate or adjust estimates of DER and/or UER and/or instead of DER and UER.

In some embodiments, the correlation data discussed above with respect to 501 may be retrieved as part of 505. For example, the correlation data may be retrieved in response to response to activation of a messaging application and/or in response to the determination that no ACK has been received for the first message.

The UE may estimate a recommended message length (506), according to some embodiments. The recommended message length may be determined based on the channel condition(s). The UE may determine the recommended message length in response to the determination that the first message is not acknowledged and/or in response to activation of a (e.g., particular) messaging application. The recommended message length may be determined in a format corresponding to a format of the relevant message type. For example, for a text message, the recommended message length may be a number of characters; for a voice or video message, the recommended message length may be a number of seconds, etc. In some embodiments, the recommended message length may be determined as a number of datagrams, bits, or bytes, and converted to a format corresponding to the message type.

The recommended message length may be determined using one or more algorithms and equations using the channel conditions. For example, worse channel conditions (e.g., higher error rate, etc.) may lead to a shorter recommended message length. In some embodiments, a longer latency may lead to a shorter recommended message length. One detailed example of how the recommended message length may be determined is presented below. This example includes a particular example for a method of calculation of DER. However, it will be appreciated that other equations and/or algorithms for either or both of DER and/or recommended message length (e.g., recommended characters (RC)) may be used as desired.

Field data and uplink/downlink correlation data may be updated in a configuration server. Field data may refer to the collection of data obtained by testing in various field testing environments which may help in determining the UER based on DER. This data may be pushed to the UE (e.g., the UE's application processor) during activation of a particular messaging application and may be updated to the UE's baseband. DER may be determined based on the system information block (SIB) or similar broadcast decode failure rate for the downlink direction.

DER may be dependent on a few parameters:

T—Time difference between message failure status indication for an uplink message is declared at baseband and the time when the uplink message was received at baseband for transmission. Note: The time difference calculation may not consider any time when a network is not available and/or any time when a system is suspended for doing location update using alternate means.

C—Number of cycles. For example, C may be calculated as follows, among various possibilities:

C=floor (T/cycle time). Cycle time may refer to the periodicity for uplink grants or downlink scheduling for a particular device in the wireless communication system.

B—Number of cycles when SIB decode was successful during T.

Using these parameters, DER may be determined as:

$$DER=(C-B)/C \hspace{3cm} \text{Equation (i).}$$

DER may be determined based on one message (e.g., the first message) or multiple messages. By feeding DER into the correlation table, the value of UER may be determined.

Another parameter, target total datagram transmission (TD) may be used in the calculation of RC. TD may indicate a number of datagrams that may be transmitted before the failure status indication. In some embodiments, TD may be a number up to a maximum number of datagrams to control latency. In other words, TD may be set based on the number of datagrams that can be transmitted while maintaining latency lower than a threshold. Thus, TD may indicate that a number of datagrams transmitted (e.g., without receiving a positive acknowledgement) before a failure status indication is generated for the transmission. Alternative parameters (e.g., in terms of packets, time, etc.) may be used instead of TD, e.g., as will be appreciated by the skilled person.

An expected value (E) indicating an expected number of datagrams to be transmitted in order for a transmission (e.g., of length N where N may refer to a number of datagrams of an uplink message) to be received successfully may be given by the following equation. For example, N may refer to the length of a previously transmitted uplink message for which transmission failed, e.g., the first message. For a failed uplink message, N may be the number of datagrams required (e.g., a minimum) to be received at destination for the message to be decoded at destination. The total length provided by the N datagrams may be equal to the message size and the included headers.

Again, note that different equations may be used as desired.

$$E=(i-1)/(1-UER)+(1/(1-(UER+(1-UER)*DER)))  \quad \text{Equation (ii),}$$

where i may range from 1 to N.

Equation ii may be used in the following Algorithm for calculation of message length (e.g., Recommended Datagrams (RD), which may be converted as further discussed below to RC):

```
Input: N, DER, UER
Output: RD
for i = 1 to N do:
    Compute E as per Equation (ii)
    if E is greater than TD
        RD <- i-1
        exit for
    else
        if i == N do
            RD <- N
        end if
    end if
end for
```

In the above algorithm, RD may be set to the highest value of i for which E is less than TD (e.g., in the case that RD is set to i−1, an expected number of datagrams transmitted (E) is less than a maximum (TD)) or RD may be set to the length of the message (e.g., in the case that RD is set to N).

Further, RD may be converted to RC (e.g., the recommended message length, in characters, e.g., which may be a format readily understandable to a user) as follows. Again, it will be appreciated that other approaches and/or parameters for converting RD to RC may be used as desired.

Each message may contain a certain number of bytes for overhead, e.g., a logical link control (LLC) header, encryption, etc. For example, a total overhead per message (TO) may be equal to 11 bytes. A total number of bytes (TB) may be given by:

$$TB=RD*17 \quad \text{Equation (iii)}$$

Thus, the recommended message length (in characters) may be given by:

$$RC=TB-TO \quad \text{Equation (iv).}$$

In the case that TO=11, then, RC=TB−11.

Note that, in some embodiments, if the recommended number of datagrams (RD) as per Equation (i) is less than 3, then RC may be the minimum message size, e.g., 39 characters. Further calculations (e.g., Equation (iii) and (iv)] may not be calculated. Different minimums, overhead (e.g., TO) and/or ratios between TB and RD may be used as desired.

In some embodiments, since the header and/or other overhead components may be part of the first datagram (e.g., in addition to a MAC header which may be present for all datagrams), the effective bytes retrieved as part of the message portion may be less.

Figure 8:
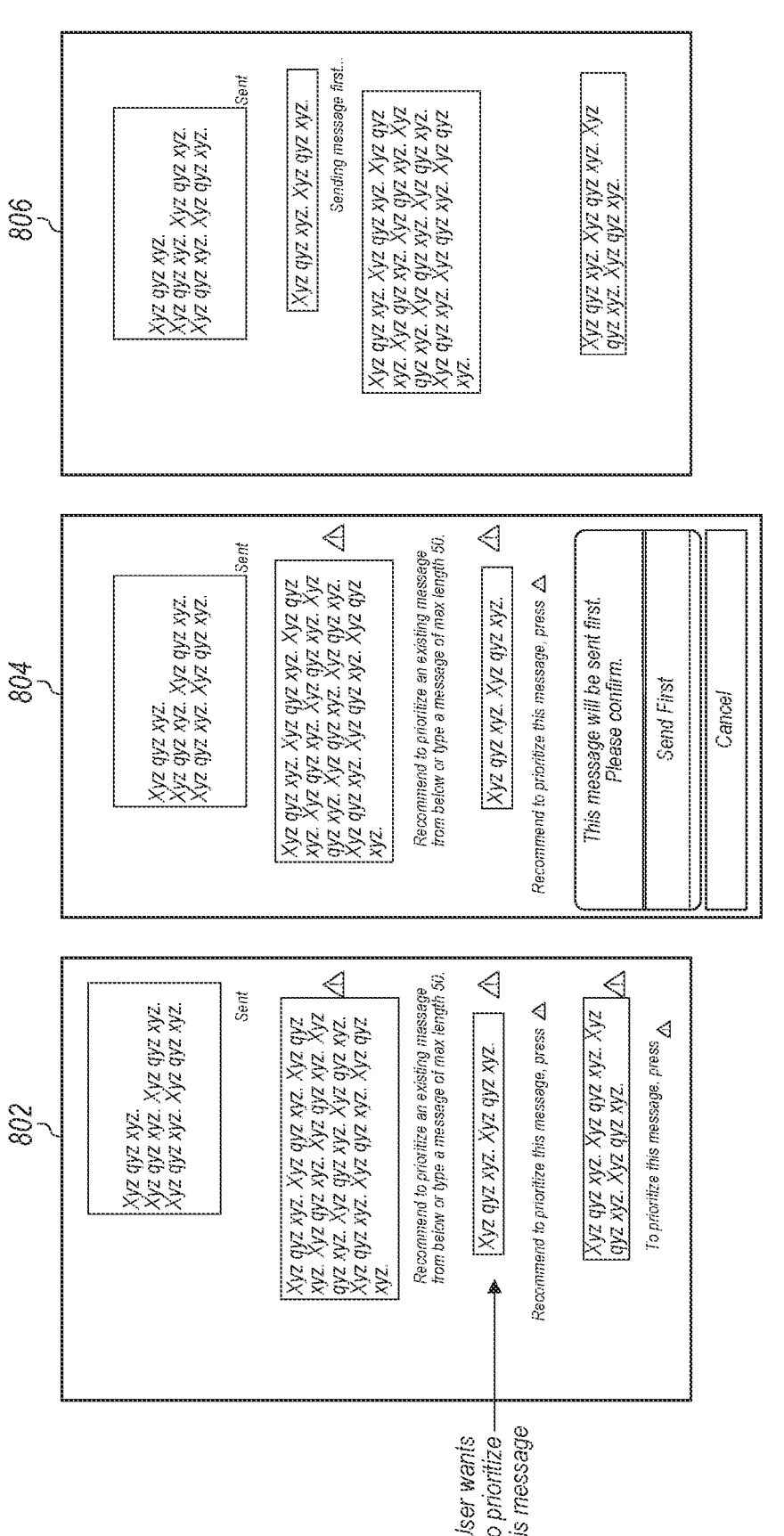
Figure 9:
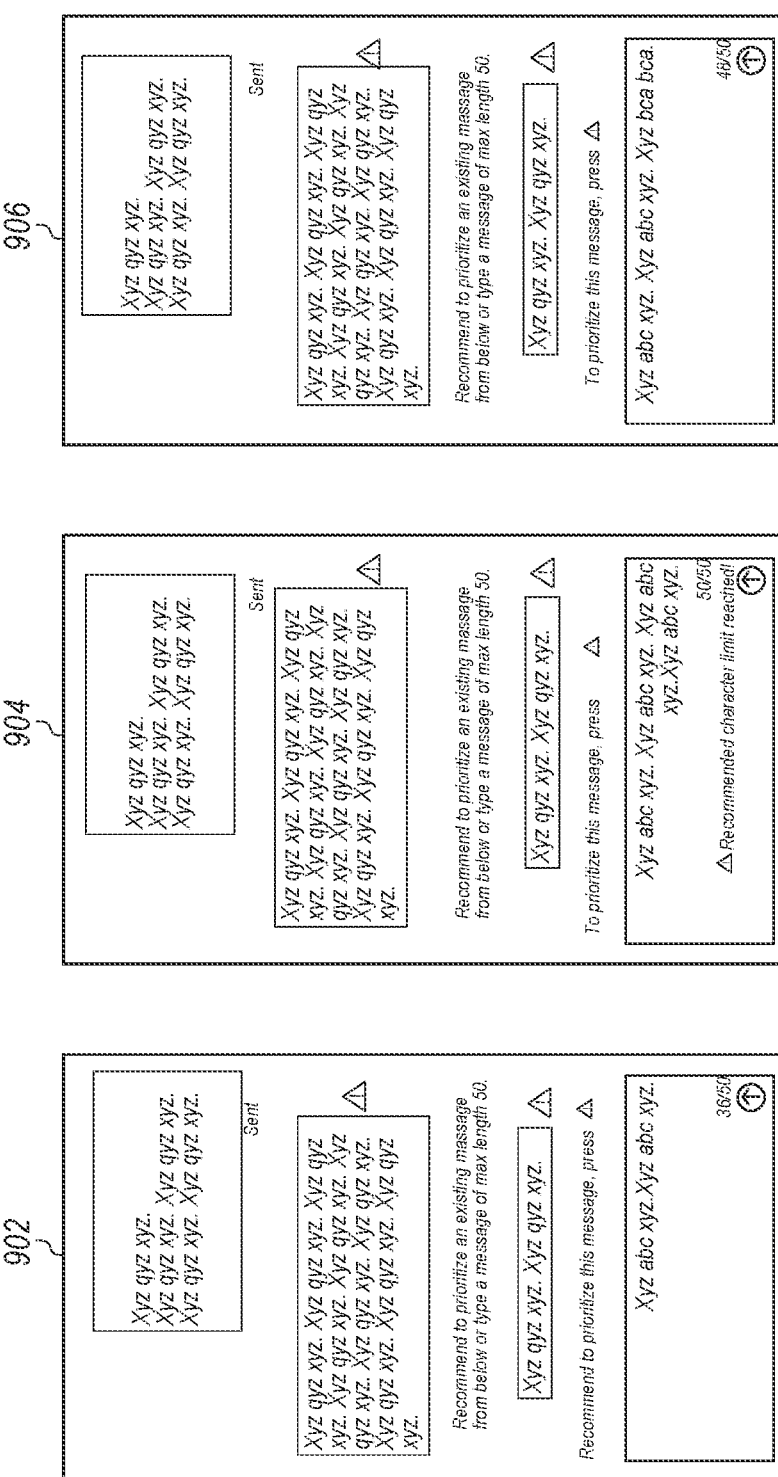
Figure 10:
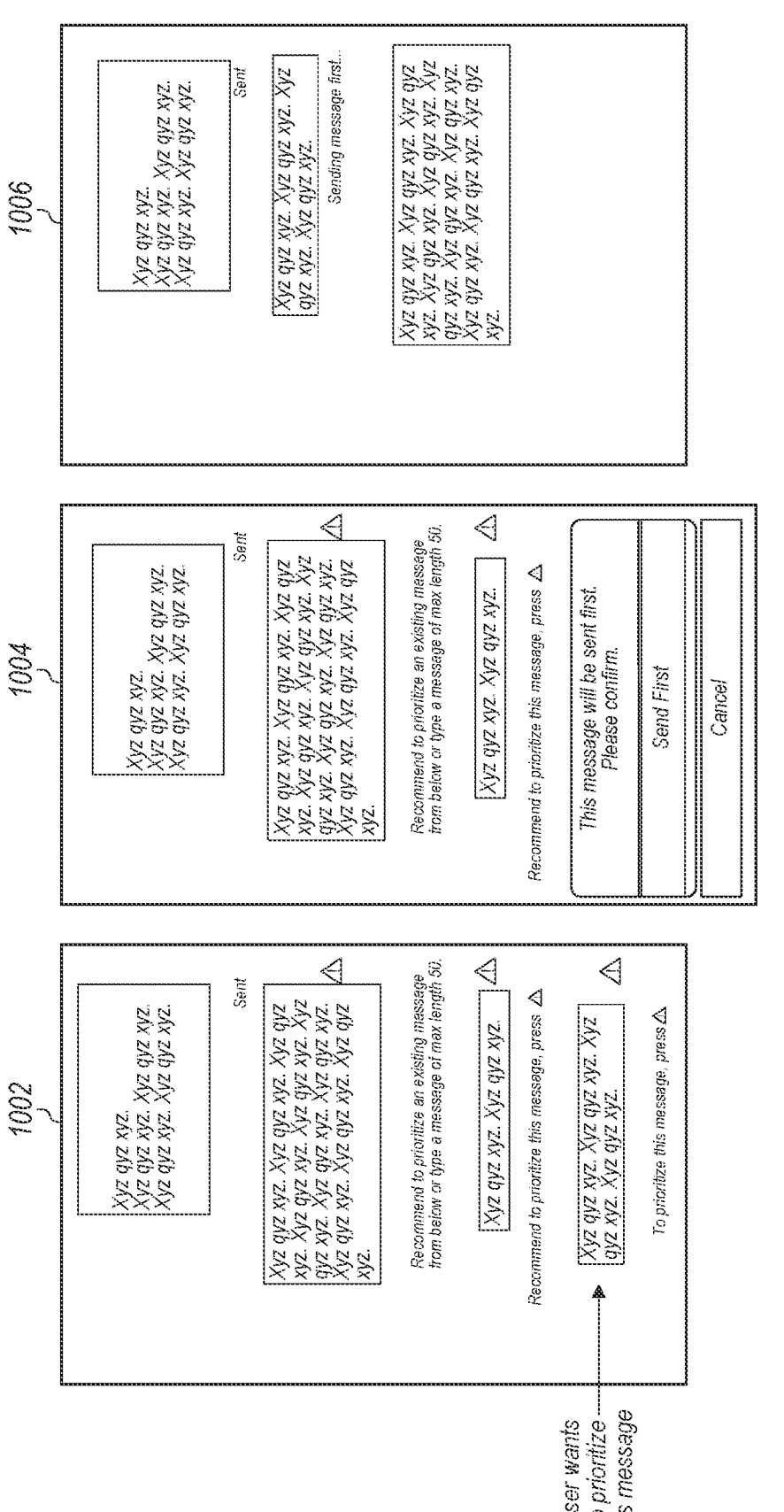

The UE may indicate the recommended message length (RC) and/or an indication related to the recommended message length via one or more user interfaces (508), according to some embodiments. For example, the UE may provide the indication via a visual and/or audio interface, among various possibilities. Various example indications are illustrated in FIGS. 8-10, but other indications may be used as desired. In some embodiments, the user may opt to select any of the possible actions based on his/her viewpoint and/or priority. For example, a user may type a new message or prioritize an existing message based on recommendation, etc.

As one possibility, the UE may indicate the recommended message length directly. For example, the indication may prompt the user to enter and/or select a message less than or equal to the recommended message length. For example, if the user has previously input more than one message which have not been successfully transmitted (e.g., or acknowledged, as discussed in 504), the UE may prompt the user to select one of the existing messages (e.g., which is less than or equal to the recommended message length). Similarly, if no entered and un-acknowledged message is less than the recommended length, the UE may indicate the recommended length and suggest that the user enter a new message up to that length. As another possibility, the UE may indicate that one or more previously entered messages are longer than recommended and prompt the user to enter or select a shorter message. As another possibility, the UE may suggest a modified (e.g., shortened) version of one or more messages entered by the user. Such a message may be generated by the UE based on information provided by the user (e.g., in one or more previously entered and unacknowledged messages). Such a message may be a default message generated by the UE using other information (e.g., including default message and/or providing data about the UE such as identifying information, location, battery level, etc.; additional or alternative information may be included according to some embodiments). As another possibility, the UE may indicate an amount by which a previously entered message would need to be shortened to match the recommended message length. It will be appreciated that any combination of these and/or other approaches may be used in combination.

In some embodiments, the UE may start a timer in response to providing the indication. For example, the timer may correspond to a maximum amount of time that the UE may wait for further user input prior to transmitting a message.

In some embodiments, the UE may indicate a particular a message that would be transmitted/prioritized absent further user input, e.g., prior to expiration of a timer. Such a message may be less than or equal to the recommended message length. For example, the UE may display a recommended, modified, or default message along with an indication that such a message will be transmitted upon expiration of the timer in the absence of further user instructions.

The UE may receive user input (510), according to some embodiments. The user input may or may not be responsive to the indication.

As one possibility, the user input may include entering or selecting a message of less than or equal to the recommended message length. For example, the user may enter a message by modifying a previously entered message so that it is less than or equal to the recommended length or may enter a new message. As another possibility, possibility, the user input may include entering or selecting a message of greater than the recommended message length. As another possibility, no user input may be received (e.g., prior to expiration of the timer).

In some embodiments, the UE may provide further notifications/information to the user, e.g., at any time following the initial notification in 508, such as while the user is able to provide input. For example, the UE may update a comparison of the length of entered message to the recommended message length, e.g., while the user is entering text. As another possibility, the UE may update/modify a recommended message, e.g., based on input provided by the user. As another possibility, the UE may provide one or more alerts to the user, e.g., as an amount of message entered increases (e.g., "You have now entered 80% of the recommended number of characters" or "You have 10 characters remaining", etc.). Similarly, a progress bar and/or color change may be used to indicate similar information. It will be appreciated that numerous variations on such information may be used as desired.

The UE may select a message (or messages) to prioritize for transmission (512), according to some embodiments. The UE may base the selection on any user input received (e.g., in 510). For example, the UE may select any message(s) entered or selected by the user.

In the event that no user input is received (e.g., prior to expiration of the timer), the UE may select a message to prioritize.

In some embodiments, the UE may select a previously entered message for retransmission. For example, the UE may determine to retransmit the first message.

In some embodiments, the selection may be based on the recommended message length. For example, the UE may select a message that was previously entered by the user or a message that was generated by the UE and recommended (e.g., as in 508). For example, the UE may select a message that was indicated (e.g., in 508) as a message that would be transmitted/prioritized absent further user input.

The UE may transmit the message (or messages) prioritized for transmission (514), according to some embodiments. In other words, the UE may transmit (or retransmit) any message(s) selected in 512.

The UE may transmit the message(s) to the same destination device and using the same wireless channel(s) as the first message (e.g., in 502) and/or the same wireless channel(s) for which channel conditions were determined (e.g., in 505).

In some embodiments, the UE may transmit the prioritized message(s) using the same or different parameters relative to the first message. The UE may use adjusted parameters to promote successful transmission of the prioritized message(s). For example, the UE may transmit a prioritized message using the same or higher transmit power. Similarly, the UE may transmit a prioritized message using the same or lower coding rate. Further, the UE may transmit a prioritized message using the same or higher number of repetitions.

In some embodiments, the UE may start a timer associated with the prioritized message(s), e.g., as discussed with respect to 502.

The UE may receive an acknowledgement of the prioritized message(s) (516), according to some embodiments. For example, the destination device may receive the prioritized message(s) and transmit an ACK to the UE. The UE may receive the ACK.

The UE may indicate the successful transmission of the prioritized message(s) (518), according to some embodiments. For example, in response to receiving the acknowledgement, the UE may provide a notification using one or more user interface. For example, the UE may indicate that the prioritized message(s) was successfully received by the destination device.

In some embodiments, the UE may repeat one or more of the steps discussed above. For example, the UE may update channel conditions and/or a recommended message length, provide an indication of the recommended message length, receive user input, and/or select and transmit a further prioritized message, etc. It will be appreciated that any step(s) may be omitted from such repetition. Such repetition may be performed if a positive acknowledgement of the prioritized message is not received (e.g., prior to expiration of the timer associated with the message). This may allow the user another opportunity to enter or select a shorter message or to retry transmission of the same message. In such a case, the recommended message length may be the same or may be shortened. Further, such repetition may be performed if a positive acknowledgement of the prioritized message is received. This may allow the user another opportunity to enter or select an additional message.

In some embodiments, 518 may be omitted, as may any of the other steps discussed above.

Thus, at least according to some embodiments, the method of FIG. 5 may be used to provide a framework according to which a wireless device can be configured to determine a recommended message length and select and transmit a prioritized message, at least in some instances. For example, for messages transmitted in limited wireless link conditions (e.g., high error rates, high latency, low bandwidth, etc.), the methods of FIG. 5 may help ensure that message transmission is taking place in an efficient manner. For example, this may reduce delay associated with failed message retransmission procedure done without taking into account the link conditions, e.g., in which a same failed message may be reattempted even in poor signal conditions. High error rates (e.g., BLER) due to poor signal conditions may impact the transmissions of large messages which may take a long time (e.g., potentially minutes). In case the same message is retransmitted, there may be further delay which may degrades the user experience. In case the signal conditions continue to remain poor and retransmission of message keeps repeating, this will end up causing huge delay impacting user experience. In case there are subsequent messages pending in the queue which may contain critical information, the retransmission of the existing large message may become a bottle neck in providing good service to the user. The methods of FIG. 5 may help to overcome this scenario and use the wireless link(s) efficiently. By dynamic assessment of uplink and downlink conditions, recommendations may be provided to the user to prioritize existing shorter messages or to enter a shorter message not exceeding the recommended length so that probability of successful transmission in a timely manner is higher. Thus, the methods of FIG. 5 may help to provide a good user experience ensuring timely service to user and efficient utilization of wireless resources and UE resources.

FIGS. 6-10 and Additional Information

FIGS. 6-10 illustrate further aspects that might be used in conjunction with the method of FIG. 5 if desired. It should be noted, however, that the exemplary details illustrated in and described with respect to FIGS. 6-10 are not intended to be limiting to the disclosure as a whole: numerous variations and alternatives to the details provided herein below are possible and should be considered within the scope of the disclosure.

As mentioned above, a recommended message length (e.g., RC and/or RD) of a next message (e.g., for prioritized transmission) may depend on factors including: channel conditions (e.g., UER, DER, etc.), a maximum number of datagrams for transmission (TD), and/or a number of datagrams for a previously transmitted failed message (N). Generally, as the error rates are higher, the recommended message length may be shorter. Similarly, as the maximum number of datagrams (TD) is smaller, the recommended message length may be shorter. Further, as the number of datagrams for a previously transmitted failed message (N) is smaller, the recommended message length may be shorter. For example, the recommended message length (RD) may be less than or equal to the length of the number of datagrams for a previously transmitted failed message (N).

Figure 6:
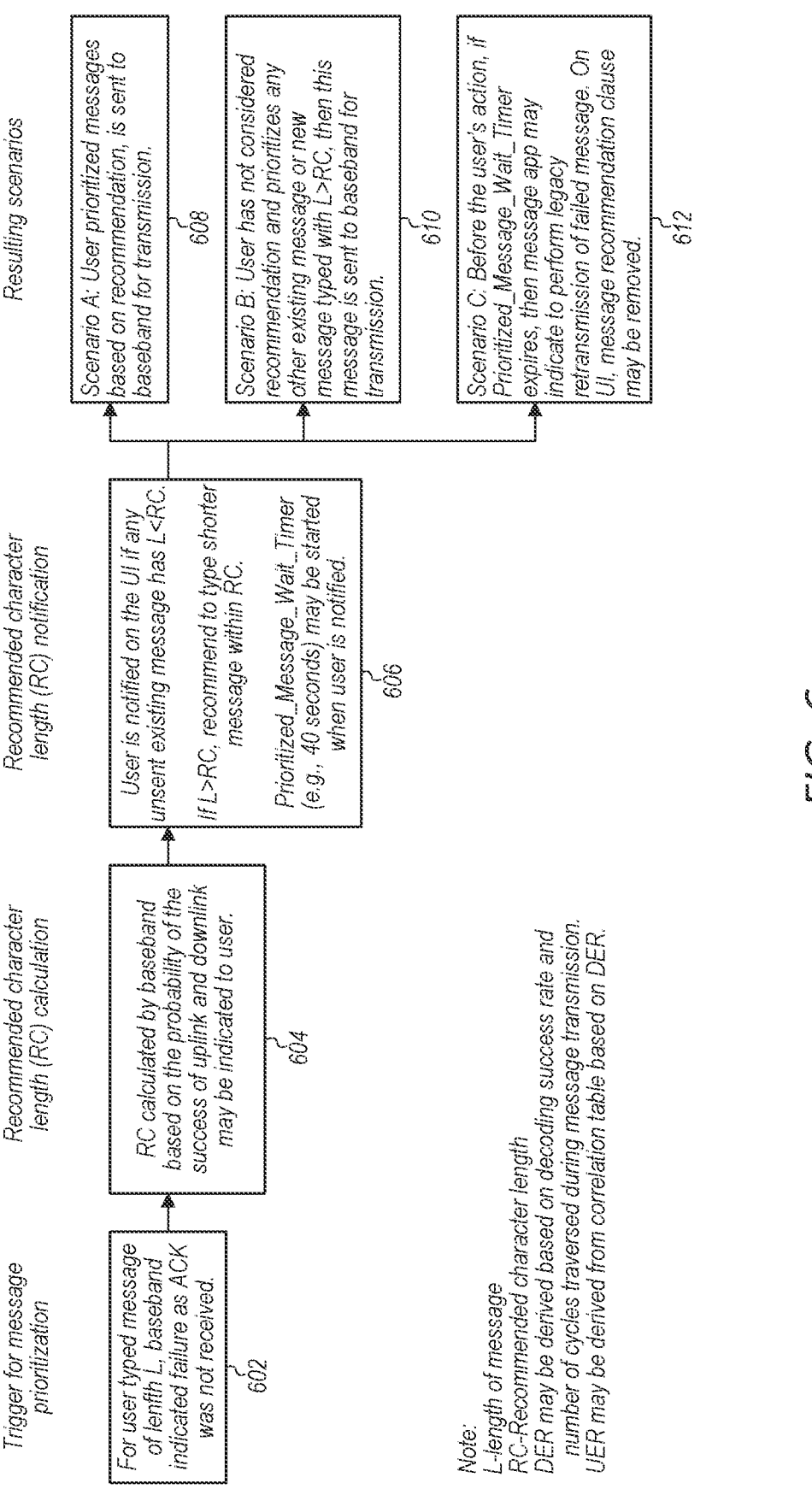
FIGS. 6-10 illustrate exemplary aspects of various possible approaches to transmission of prioritized messages in a wireless communication system, according to some embodiments.

FIG. 6 illustrates a possible example of the method of FIG. 5, according to some embodiments.

In 602, a user may type a message of certain length (L). Baseband may report failure after T (e.g., seconds, minutes, frames, etc.) as the baseband did not receive acknowledgement from the destination. The message failure may be considered a trigger to initiate further prioritization, e.g., of a shorter message.

In 604, the baseband may determine a recommended message length, e.g., in characters (RC). The baseband may indicate RC to the user. The indication of RC may be provided along with an indication of the failure of the first message. RC may be calculated based on the probability of the success of the uplink message based on uplink and downlink failure/error rates. For example, DER may be determined based on the SIB decode success rate on the downlink. UER may be derived from correlation table based on the DER.

In 606, the UE may provide a notification on the user interface if any existing message in the queue (e.g., previously entered messages that are not yet successfully transmitted/acknowledged) has character length less than RC. If there is no message that falls in this category, a recommendation may be provided to type or enter a shorter message not exceeding the recommended length, RC. When user is provided this notification, the application processor may start a timer (e.g., Prioritized_Message_Wait_Timer). The duration of the timer may be configured as desired; for example, the duration may be 40 seconds, among various possibilities.

Any one of the following scenarios can take place:

Scenario A: User prioritizes according to the recommendation, e.g., by entering or selecting a message less than or equal to RC. The prioritized message may be sent to baseband for transmission.

Scenario B: User does not prioritize according to the recommendation, e.g., and prioritizes any other existing message or new message with length L>RC. This message may be sent to baseband for transmission. However, this may not increase the probability of successful delivery as the character length is greater than RC.

Scenario C: Before the User takes any action to enter or select a message, the Prioritized_Message_Wait_Timer may expire. Then application processor may determine to perform retransmission of the failed message and may send the message to baseband for retransmission. On the user interface, the message recommendation clause (e.g., indication of RC) may be removed by the UE. As an alternative possibility, the application processor may determine to perform transmission of a recommended message and may send the recommended message to baseband for retransmission.

In some embodiments, this procedure may repeat again. For example, a repetition may be triggered if message failure status indication is received (e.g., at the application processor from the baseband) for those messages which were not previously prioritized or recommended.

In some embodiments, whenever application processor sends a message to baseband, it may indicate whether it is a recommended or prioritized message or a normal message. For example, such an indication may be provided by using a true/false flag, e.g., Recommended_Message Flag=True/False. If the application processor indicates Recommended_Message Flag=True in a message transmission request to baseband, the recommendation procedure may not performed again at that time (e.g., the baseband may not re-determine a recommended message length, etc.). If the application processor indicates Recommended_Message Flag=False, then baseband may perform the recommendation procedure.

Figure 7:
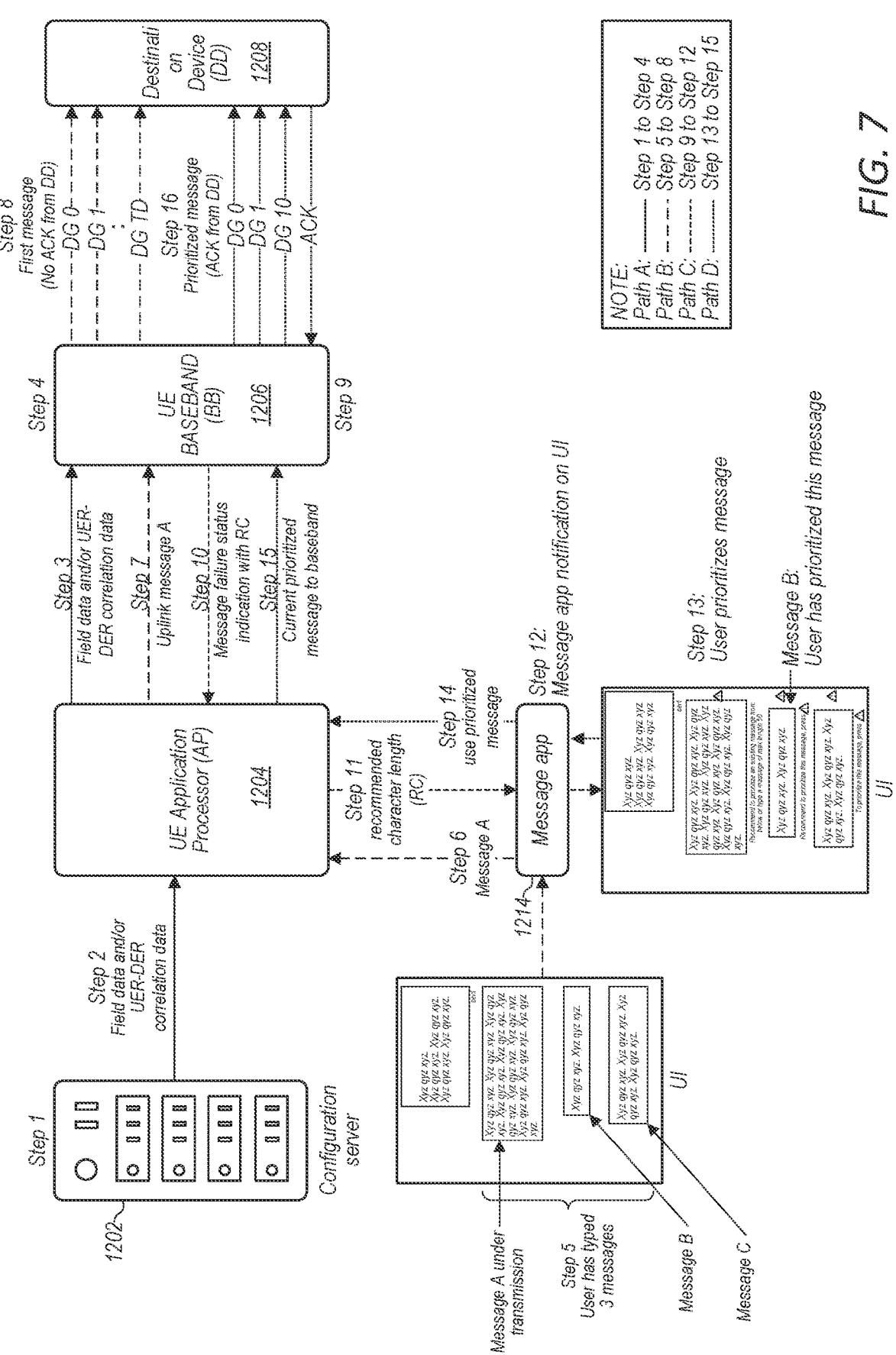

FIG. 7 illustrates a further example of the method of FIG. 5, according to some embodiments. In the illustrated example, the process may occur according to the following steps.

Step 1: Field data and/or uplink—downlink condition correlation data (e.g., for UER and DER) may be updated in a configuration server 1202.

Step 2: Field data and/or uplink—downlink condition correlation data may be pushed to UE's application processor. This may occur upon activation of a particular application, e.g., message app 1214.

Step 3: Field data and/or uplink—downlink condition correlation data may be sent from application processor (AP) 1204 to baseband (BB) 1206.

Step 4: Field data and/or uplink—downlink condition correlation data may be stored in a correlation table at BB 1206. The data and/or table may be used for predicting UER from a calculated DER.

Step 5: User may have entered 3 messages in a message app 1214. For example, the user may have typed message A of 146 characters, message B of 42 characters, and message C of 82 characters.

Steps 6 and 7: Message A may be transmitted from message app 1214 to baseband via the application processor. The message may be provided to baseband with total character length: 146+header length: 4. Thus, the message size in bytes may be 150

Step 8: Baseband may send a maximum number of datagrams (DGs) to destination device (DD) 1208 for the message A. For example, DG0-DG TD may correspond to a maximum number of DGs (e.g., DG TD may be the datagram transmitted when TD datagrams is reached). However, the BB 1206 may not receive ACK from DD (e.g., prior to expiration of a timer).

Step 9: Baseband may calculate a recommended number of characters (RC), e.g., using equations and/or algorithms as discussed above. The calculated RC may be 50.

Step 10: Baseband sends a message failure status indication along with an indication of the RC=50.

Step 11: The application processor may forward RC=50 to the message app and may stops further legacy retransmission of the failed first message.

Step 12: The message app may notify the user (e.g., on a user interface such as the display) if any existing message in the queue has a character length less than RC. If not, the message app may provide a recommendation to enter a shorter message not exceeding the recommended length (RC). Also, message app may start a timer (e.g., Prioritized_Message_Wait_Timer, e.g., for 40 seconds).

Step 13: Before the timer expiration, the user may select message B (42 characters) based on recommendation. For example, the recommendation may include a send first option, and the user may select this option for message B. Note: Alternatively, the user may type a shorter message as per the recommendation so that it can be prioritized.

Step 14: Message app may send the prioritized message selected/typed by the User. Note: If Prioritized_Message_Wait_Timer expires before the User's action, message app may indicate application processor to perform legacy retransmission (e.g., of the first message A).

Step 15: The application processor may send the prioritized message to baseband.

Step 16: Baseband may send 11 DGs to DD for the prioritized message B. The baseband may receive ACK from DD. The AP and message app may indicate the success via the display, if desired.

FIG. 8 illustrates an example series of displayed messages, according to some embodiments. For example, FIG. 8 illustrates the messages A, B, and C discussed with respect to FIG. 7 in the scenario that the user prioritizes an existing message (e.g., message B). As shown, in 802, the UE indicates to the user a recommendation to prioritize message B or type a message of less than the recommended length (RC=50). The user may indicate to prioritize message B. In 804, the UE may prompt the user to confirm the selection. In 806, the UE may display that message B is being sent first (e.g., is prioritized based on the user input).

FIG. 9 illustrates an example series of displayed messages, according to some embodiments. For example, FIG. 9 illustrates the messages A, B, and C discussed with respect to FIG. 7 in the scenario that the user enters a new message. As shown, in 902, the UE indicates to the user a recommendation to prioritize message B or type a message of less than the recommended length (RC=50). The user may begin to type a new message. The UE may display the number of characters used and compare that to the recommended length. For example, the UE may display 30/50 indicating the comparison of (used characters)/(recommended characters). In 904, the UE may alert the user when the recommended length is reached. In 906, the user may consider the recommendation/alert, and may modify the entered message, e.g., to stay within the recommended length.

FIG. 10 illustrates an example series of displayed messages, according to some embodiments. For example, FIG. 10 illustrates the messages A, B, and C discussed with respect to FIG. 7 in the scenario that the user prioritizes an existing message (e.g., message C) that was not recommended. As shown, in 1002, the UE indicates to the user a recommendation to prioritize message B or type a message of less than the recommended length (RC=50). The user may indicate to prioritize message C. In 1004, the UE may prompt the user to confirm the selection. In some embodiments, the UE may further alert the user that the selected message (C) is not consistent with the recommended length. In 1006, the UE may display that message C is being sent first (e.g., is prioritized based on the user input).

It will be appreciated that various examples refer to a user typing messages. However, embodiments are not limited to typed entries. Other interfaces/methods for entering messages may be used as desired, e.g., including voice dictation, etc.

It will be appreciated that the example user notifications (e.g., prompts, alerts, queries, etc.) presented in the figures and description are examples. Many variations of such notifications and/or alternative/additional notifications are possible and may be used as desired.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:

at a user equipment (UE) device:
  wirelessly transmitting a first message;
  determining that the UE device has not received a positive acknowledgement of the first message by a first time; and
  in response to the determination that the UE device has not received the positive acknowledgement of the first message by the first time:
    calculating a recommended message length;
    providing a notification via one or more user interface based on the recommended message length;
    selecting a prioritized message; and
    wirelessly transmitting the prioritized message.

2. The method of claim 1, wherein the first message is longer than the recommended message length.

3. The method of claim 1, wherein the notification comprises an indication of the recommended message length.

4. The method of claim 1, wherein the notification comprises an indication of a recommended message of a plurality of messages input via the one or more user interface.

5. The method of claim 4, wherein the recommended message is selected from the plurality of messages based on a determination that a length of the recommended message is less than or equal to the recommended message length.

6. The method of claim 1, wherein the prioritized message is selected based on user input received via the one or more user interface.

7. The method of claim 1, wherein the recommended message length is calculated so that an expected number of data grams transmitted by the UE device for successful transmission of a message of the recommended message length is less than a threshold number of datagrams.

8. The method of claim 1, wherein the recommended message length is calculated based on uplink and/or downlink channel conditions.

9. The method of claim 1, wherein the recommended message length is calculated using a correlation table of uplink and downlink error rates.

10. A user equipment (UE) device, comprising:

one or more user interface;

a radio; and a processor operably coupled to the radio and the one or more user interface and configured to cause the UE device to:
  receive, via the one or more user interface, a first message;
  wirelessly transmit the first message;

determine that the UE device has not received a positive acknowledgement of the first message by a first time;
  in response to the determination that the UE device has not received the positive acknowledgement of the first message by the first time, provide a notification via one or more user interface recommending to prioritize a shorter message;
  receive, via the one or more user interface, an indication of a prioritized message; and
  wirelessly transmit the prioritized message.

11. The UE device of claim 10, wherein the notification comprises an indication of a second message, received via the one or more user interface, that is recommended.

12. The UE device of claim 11, wherein the prioritized message is the second message.

13. The UE device of claim 11, wherein the prioritized message is different than the second message.

14. The UE device of claim 10, wherein the notification comprises an indication of a recommended message length.

15. The UE device of claim 14, wherein the notification comprises a comparison of a length of an entered message to the recommended message length.

16. The UE device of claim 10, wherein the notification comprises an alert if a length of an entered message exceeds a recommended message length.

17. An apparatus, comprising:

a processor configured to cause a user equipment (UE) device to:
  dynamically determine a current channel condition for a wireless channel;
  determine a recommended message length, wherein the recommended message length is determined dynamically based on the current channel condition;
  indicate, via a user interface, a notification based on the recommended message length;
  receive, via the user interface, an indication of a prioritized message subsequent to indicating the notification; and
  transmit the prioritized message in response to the indication.

18. The apparatus of claim 17, wherein the processor is further configured to cause the UE device to:
  activate a messaging application, wherein the determination of the current channel condition is in response to the activation of the messaging application.

19. The apparatus of claim 17, wherein to determine the current channel condition, the processor is further configured to cause the UE device to:
  retrieve correlation data of uplink and downlink error rates;
  determine a downlink error rate; and
  determine an uplink error rate based on the downlink error rate and the correlation data.

20. The apparatus of claim 17, wherein the recommended message length is determined so that an expected number of datagrams transmitted (E) for successful transmission of a message of the recommended message length is less than a maximum number of transmitted datagrams (TD).

* * * * *